Oct. 29, 1968   A. J. VAN NOORD   3,407,684
REMOTE CONTROL MIRROR
Original Filed Feb. 16, 1965   2 Sheets-Sheet 1
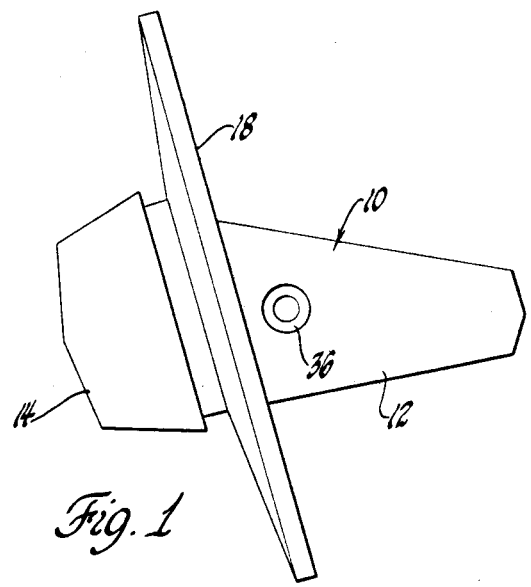
Fig. 1
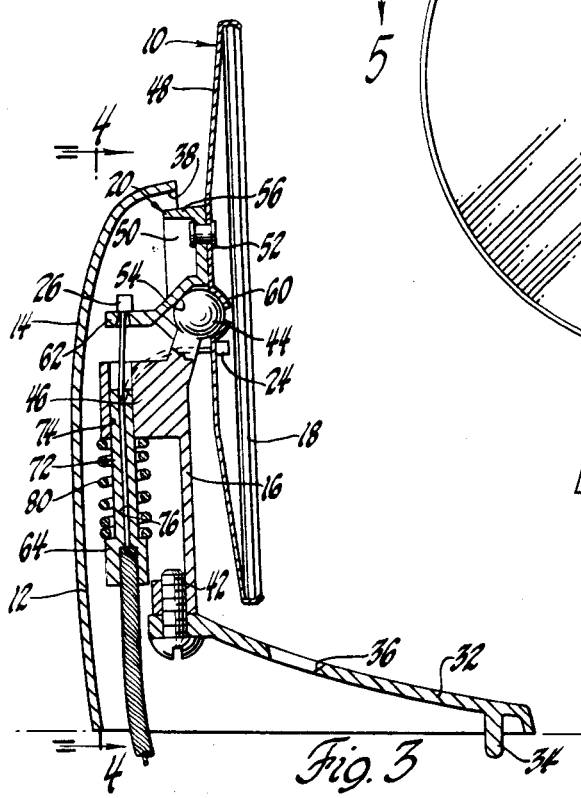
Fig. 2
Fig. 3
INVENTOR.
Andrew J. Van Noord
BY
Dale A. Winnie
ATTORNEY

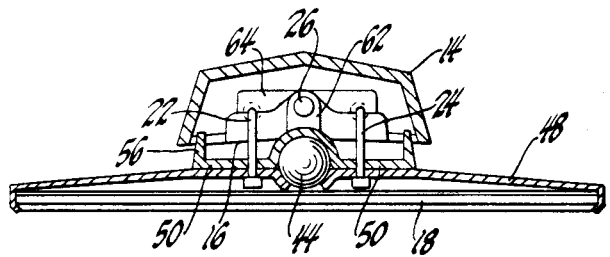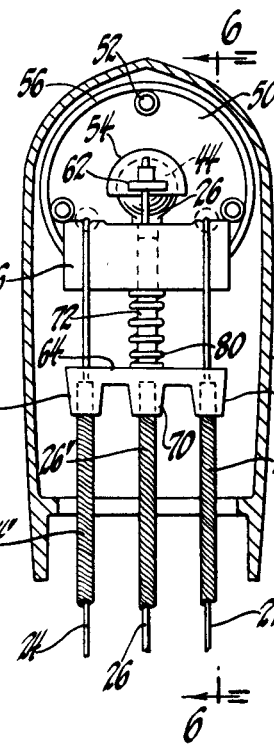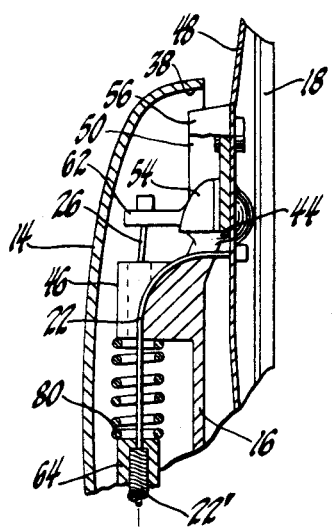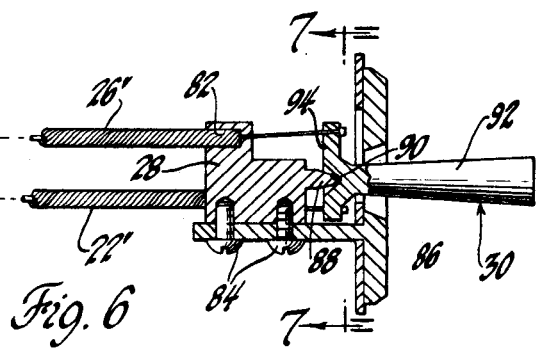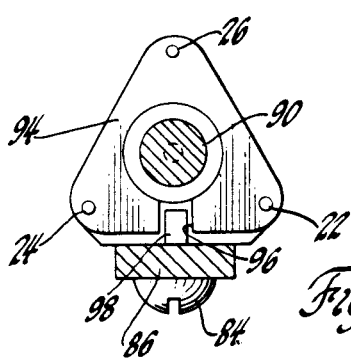

United States Patent Office 3,407,684
Patented Oct. 29, 1968

3,407,684
REMOTE CONTROL MIRROR
Andrew J. Van Noord, Grand Rapids, Mich., assignor to Kent Engineering, Grand Rapids, Mich., a partnership of Michigan
Continuation of application Ser. No. 433,050, Feb. 16, 1965. This application Feb. 27, 1967, Ser. No. 627,910
6 Claims. (Cl. 74—501)

ABSTRACT OF THE DISCLOSURE

A tiltable mirror actuated by remote control means. Movement of the control means is transmitted by flexible cables in sheaths. Spring means between the ends of the sheaths and the support for the mirror allow sheath elongation during installation.

---

This application is a continuation of patent application S.N. 433,050 filed Feb. 16, 1965, and having the same title, now abandoned.

This invention relates to rear view mirrors in general and more particularly to remote control rear view mirrors.

One of the most widely accepted remote control rear view mirrors has been the flexible cable remote control mirror which uses a plurality of separate flexible cable members connected to the back of a pivotally mounted rear view mirror and in turn to control means disposed apart from the mirror. A woven wire control cable is provided in a protective sheath and requires in most instances that the cables be kept taut in order to transmit a mirror activating force through the sheaths. Since the cables are operative in tension and do no work in compression three or more cables are usually used because of the greater number of combinations of pairs and singular cables that can be tensioned in order to obtain different mirror head movements.

A flexible woven cable transmits lineal movement best through a sheath which enables it to act through a fixed distance. That is, the length of the sheath must be relatively fixed and restrain the cable so that the force applied at one end is undiminished at the other end.

A sheath which is loose on a cable, not fixed at either end, provides no guide for the cable and nothing for it to react against. The cable will merely straighten itself if pulled, or bow out if pushed outwardly.

Fixing one end of a sheath will not change anything since the cable will merely straighten the sheath with it or loop out beyond the free end of the sheath when it is placed in compression. Accordingly, it is normally considered necessary to fix both ends of a sheath that is about a control cable.

With a helix wound spring wire sheath another problem is introduced when both ends of the sheath are fixed. Namely, when the sheath is bent and turned it extends or grows in length. This is because the close wound turns of the wound wire sheaths are not compressible on the smaller or shorter radius of a turn but they are expandable and do increase in length about the larger or longer radius. The fact that the ends of the sheaths are fixed is of no consequence since the sheaths are flexible themselves and can be made to merely bow out a little somewhere. However, the consequence of this change in the length of the calle sheaths is that the control cables themselves are, in effect or relatively, pulled inside the sheaths and made to have a less effective operative length.

If the control cables for a remote control mirror or the like could be consistently cut to a given length and would be similarly tensioned when insalled, the growth or elongation of the cable sheaths would be of no consequence since they could be anticipated. However, installation in different location, on different model cars, around mechanical and power operated window lifts, can not be compensated for in advance.

Another consequence of the elongation of the cable sheaths is to place the control cables under greater tension and in some instances, it has been considered necessary to provide some yieldable means in the control cables themselves, or between the mirror member and its support, so that the cables are not too severely strained or, if their effective length is shortened, so that they will not unduly pull the mirror to one side or the other during installation of the mirror or otherwise adversely effect either the installation or the subsequent operation of the mirror.

In certain remote control mirror assemblies, where the control cables are also used to hold the mirror on a pivot point, the control cables may also have tensionable springs engaged to each of them or like spring means provided between the mirror and its support.

The present invention is directed to a much more simplified remote control mirror structure than those known heretofore or presently in use.

It is an object of this invention to provide a fixed ball and socket remote control rear view mirror with a three wire control system for operation thereof and with the control wires or cables operatively engaged to the back of the mirror.

It is an object of this invention to provide a remote control rear view mirror having woven wire control members provided in protective helix wound sheaths of spring wire and to provide means to compensate for any variation in the effective or relative length of the cables in the sheaths.

It is an object of this invention, in this latter respect, to teach the use of means acting on the cable sheaths rather than the control cables themselves to provide the compensation necessary in the disclosed remote control mirror system.

In the overall combination of features, it is an object of this invention to provide a remote control rear view mirror which is simple in construction, includes a minimum of parts, and is easy to assemble, test and install. Moreover, it is an object of this invention to provide a mirror which is attractive in appearance, needs no wind resistant protective shell, and is at all times stable in operation. Other advantages include a mirror construction which can be pre-assembled and tested and is ready for use as soon as it is installed.

These and other objects and advantages to be gained in the practice of this invention will be better understood and appreciated upon a reading of the following specification in regard to a preferred embodiment of the invention and having reference to the accompanying drawings wherein:

FIGURE 1 is a top plane view of a remote control rear view mirror including the features of this invention.

FIGURE 2 is a front elevational view of the remote control mirror of this invention and show the part of the mirror which faces rearwardly as installed on an automotive vehicle.

FIGURE 3 is a cross-sectional view of the mirror shown in the second drawing figure, as seen in the plane of line 3—3 thereon.

FIGURE 4 is a cross-sectional view of the same mirror shown by the first three drawing figures, as seen in the plane of line 4—4 of the third drawing figure.

FIGURE 5 is another cross-sectioned view of the same mirror, this time as seen in the plane of line 5—5 of the second mentioned drawing figure.

FIGURE 6 is a cross-sectional view of a fragmentary part of the mirror of the other drawing figures, as seen off-center and essentially in the plane of line 6—6 in FIGURE 4, and which also shows a cross-section of the control means, enlarged for better viewing.

FIGURE 7 is an enlarged cross-sectional view of part of the control means of the last mentioned drawing figure as seen in the plane of line 7—7 thereon.

The remote control rear view mirror assembly 10 includes a base member 12 formed to provide a shroud 14 about a support 16 which is secured to it. A mirror member 18 is pivotally mounted on the support 16 and the remote control means 20 of this invention is disposed inside the shroud and is connected to the back of the mirror.

The remote control means 20 includes three laterally flexible cable members 22, 24 and 26 which extend through the base member 12 and within the shroud 14 behind the support 16. They pass over and through the support 16, in a manner later described, and are engaged to the back of the mirror. At the same time, their opposite ends extend through a vehicle door panel or the like, not shown, and to a block 28 which is part of the control member 30, as per FIGURE 6, and which is used to turn and pivot the mirror 18 on its support 16 to a desired viewing angle.

The base member 12 includes a rearwardly extending part 32 with a depending projection 34 near one end and a screw hole 36 by means of which it may be properly located and secured to a door or other vehicle panel. The shroud 14 extends vertically over the part 32 and is about the same width. In other words, it is not a wind resistant protective shell that is receptive of the mirror 18 therewithin; although it may be so forward if desired, for appearance sake or otherwise. It is open near the top, as at 38, on the side next adjacent the mirror 18 but it is closed by the support 16 therebelow.

The support member 16 and shroud 14 form a housing, of sorts, with the support 16 serving as the front wall of a chamber space 40 provided therewithin. The support 16 is held to the base 12 by a screw 42 and includes other means, not shown, which assure that it will be oriented properly in assembly with the base shroud 14.

The support 16 is formed to include a ball head projection 44 at its upper end. The ball head part 44 extends over the rest of the support and slightly in front thereof. The support also includes a projection 46 on its back side, within the protective space 40, through and over which the cables 22, 24 and 26 are guided in their engagement with the mirror 18.

The rear view mirror 18 includes a case 48 in which the reflective member is held. It has a member 50 fastened to its back side, and held in engagement thereto as by rivets 52 or the like. The member 50 is formed to include a socket seat part 54 receptive of the ball part 44. The member 50 is also formed to include a semi-circular peripheral flange 56 which is received in the open end of the support shroud 14 and cooperates therewith as the mirror is pivoted on the support to prevent any opening from showing therebetween and dirt, rain, snow or the like from having ready access therewithin.

The mirror case 48 is also formed to include a socket seat part 60. It is complementary to the socket seat part 54 and the two receive the ball head part 44 therebetween. The ball head part is received into the socket seat connection and held fast in what is considered a fixed ball and socket pivotal joint arrangement.

Referring now to the control means 20, the cable members 22, 24 and 26 are multiple wire strains woven together, and accordingly flexible, and which are capable of transmitting a force therethrough while in tension but not in compression. Each is provided in a helical wound spring wire sheath 22', 24' and 26' respectively.

In the present instance the control cable members 22 and 24 pass over the projection 46 on the back of the support 16 and are each engaged to the back of the mirror case 48 on respectively opposite sides of the ball and socket pivot connection. The third cable 26 is engaged to a part 62 which projects outwardly from back of the mirror case 48 and is, in fact, a part of the member 50 which forms the socket seat part of the pivotal connection. It will be appreciated that the arm 62 extends out of the plane of the mirror, or mirror back, and provides a connection for the third cable which extends directly over it and so that it does not have to assume a 90° angle bend as with the other two cables 22 and 24.

Referring to FIGURES 3–6 it will be appreciated that the cables 22 and 24 extend beyond their respective sheaths and are guided over the back of the support part 46 which is rounded and may be formed to include grooves receptive of the cables therein. The third cable 26, however, passes through the support part 46.

The sheaths 22', 24' and 26' terminate short of the support part 46 over and through which the cables pass. In fact, their terminal ends are received in a member 64 which extends across all three of them and is formed to include collars 66, 68 and 70 respectively receptive of the ends of the sheaths 22', 24' and 26' in bores provided therein. The sheaths 22' and 24' bottom in their respective collar members 66 and 68 while the cable members 22 and 24 pass therethrough. The sheath 26' similarly bottoms in the collar member 70 and the cable 26 passes on through it but also through a stem 72 extending thereover. The stem part 72 is part of the cross piece 64 and extends over it. It is received and is recipient in a bore 74 provided through the support part 46. The cable 26 is, in turn, received through a passageway 76 provided through the stem.

Between the cross member 64 and the overhanging support part 46, and about the stem 72, is a compression spring 80. It is the spring 80 which allows for linear elongation and contraction of the cable sheaths which is necessary and forms a significant part of this invention.

Referring now to the control end of the cables, the cable sheaths 22', 24' and 26' are received in receptive bores 82 provided in the block 28. The block 28 is in turn secured by screws 84 to an escutcheon plate. It is also formed to include a pivot head support 88 on which is received the control member 30. The latter is formed to include a seat 90 which cooperates with the pivot support 88 to provide a universal joint action in the control member.

The control member 30 includes a finger tip lever 92. A triangular part 94 is provided on the end of the lever in the plane of the pivotal support 88 on the block 28. Each of the control wires 22, 24 and 26 are secured to one of the points of the triangular part 94. One of the straight sides of the control member 30 is disposed next adjacent the part of escutcheon plate to which the block 28 is secured so that the control cannot be rotated but it can be manipulated to place the different control cables in tension and cause them to be pulled through their respective sheaths to operate the mirror 18 on its support 16.

A guide slot 96 may be provided in the triangular part 94 to cooperate with a key 98 which may be provided on the escutcheon plate if further pilot control of the control element is desired. Such means are best shown by FIGURE 7.

The actual manner in which the remote control mirror is moved in different directions by the use of three cable controls is generally known and should require no detail description. Also, the drawings are deemed adequate to make apparent any differences which do in fact exist over known structures. No major claim is made in this respect and so the remaining discussion is directed principally to the more significant contribution in the present instance of accommodating any changes in the control cables or sheaths which might adversely affect the assembly, installation or operation of the disclosed mirror.

In practice, the control cables and sheaths are cut to prescribed lengths. The control cable members are connected to the control member 30 at one end and to the back of the mirror 18 at the other. Their sheaths, in turn, are received in the support block 28 and in the collar receptive parts 66, 68 and 70 of the spring biased cross member 64 at the mirror head end.

Now then, it will be appreciated that if the cables in the respective sheaths are bent first in one direction and then in another that the spring wire helix wound sheaths will be elongated on the outer radius of each turn and accordingly cause the overall length of the different sheaths to be extended slightly. Although this "growth" may be as little as one sixteenth of an inch, this amount is sufficient to noticeably change the position of a mirror when the cable sheaths ends are fixed.

A further consequence can be to cause undue tension in the control cables and for them to break or the mirror to bind because of too much friction at the mirror head pivot joint.

In the present instance the ends of the sheaths are engaged by the cross member 64 which is guided on the support and backed up by the compression spring 80. The force of spring 80 is sufficiently strong to hold the cross member stationary during normal operation of the mirror after it is installed, but it is such as will yield and allow the cross member to adjust relative to the support as a consequence of growth or extended length of the sheaths in being routed around bends and corners during installation.

When the sheaths are caused to be longer, the effective length of the cables is made shorter as if they are pulled into the sheaths. However, since the sheaths are able to extend an amount equal to the contraction of the cables, due to the yielding resistance of the spring 80, there is no tension induced in the cables which might cause them to break or the mirror to bind due to too much friction at the pivotal joint.

As the cable sheaths are required to be bent and twisted in the installation of the present mirror on different model vehicles or on the same models with the different window operating mechanisms, or the like, the difference in length in the protective sheaths about the control cable is readily accommodated by the means afforded between the ends of the cables and engaged with the sheaths, more particularly at the mirror head end and between the mirror support and the ends of the sheaths, as has been described.

A light spring, such as might be used in certain remote control mirrors to tension the control cables, for better frictional control in their sheaths, or at the mirror head pivotal joint, is not to be confused with the heavier spring 80 used in this instance; nor as regards the purpose it serves.

The spring 80 is operative only during installation of the remote control mirror on which provided. It is not used to tension the control cables, hold the mirror on a pivot point, or provide vibration or other turning resistant friction in the pivot joint. On the contrary, it acts only on the cable sheaths and only as necessary to relieve the forces acting to cause elongation of the sheaths and undue tension of the cables. It provides an immobile and resistant force behind the cross bar 64 when the tensile force in one or two of the cables places a compressive load in one or more of the sheaths, as during normal operation of the mirror. It is not intended as a means of providing friction for control but for relieving undue friction which could adversely affect the operativeness of the mirror.

Although a specific form of the present invention has been shown and disclosed, it will be appreciated that some modification and variation therein is possible and to the extent that such modifications and variations come within the teachings of this invention they are to be considered as inclusive under the hereinafter appended claims.

I claim:

1. In a remote control rear view mirror and like assembly including an operative member and a control member spaced apart and having laterally flexible cable means operative in tension and provided in protective sheaths therebetween, and wherein said sheaths are required to be retained against relative movement for providing fixed guide paths in the operational use of said cable means, the improvement comprising;

supports having means for fixed engagement to a supporting structure and each including fixed and invariable means of pivotal support for said operative and control members thereon, said flexible cable means being directly connected to said operative and control members and extending therebetween, and means for longitudinally biasing said sheaths for relatively fixing the relation of the ends thereof to said supports and providing fixed guide paths for said cables during operational use, and for allowing elongation of said sheaths in the bending of said sheaths and cables during installation of said assembly.

2. The improvement of claim 1, said biasing means being provided between at least one of the ends of said sheaths and one of said supports.

3. The improvement of claim 1, said biasing means including;

a member guided for reciprocal movement on the support for said operative member and having engagement with the ends of said sheaths next thereto.

4. The improvement of claim 3, said reciprocal member including a part received in telescopic engagement with the operative member support and comprising a crossbar receptive of the ends of said sheaths in engagement therewith and the control cables in guided relation therethrough.

5. The improvement of claim 4, the means of pivotal support for said operative member including a ball socket connection relatively offset from the axial line of movement of said reciprocal member, and a lever arm provided on the back side of the operative member and projecting relatively over the reciprocal member for control cable engagement therewith.

6. The improvement of claim 5, at least one of said cable means being provided through the telescopic part of the reciprocal member and engaged to said lever arm.

References Cited

UNITED STATES PATENTS

| 2,931,245 | 4/1960 | Jacobson | 74—501 |
| 3,183,736 | 5/1965 | Jacobson | 74—501 |

MILTON KAUFMAN, *Primary Examiner.*

Dedication 3,407,684.—*Andrew J. Van Noord*, Grand Rapids, Mich. REMOTE CONTROL MIRROR. Patent dated Oct. 29, 1968. Dedication filed Dec. 29, 1980, by the inventor.

Hereby dedicates to the Public the entire term of said patent.

[*Official Gazette June 23, 1981.*]